United States Patent [19]

Tokuyama et al.

[11] Patent Number: 5,666,334
[45] Date of Patent: Sep. 9, 1997

[54] STORAGE DEVICE CAPABLE OF USING BOTH OPTICAL AND MAGNETIC DISK UNITS FOR STORING INFORMATION DATA

[75] Inventors: Mikio Tokuyama, Tsukuba; Yoshinori Takeuchi, Ishioka; Susumu Ebihara, Fujisawa; Kenji Mori, Hadano; Sadanori Nagaike, Odawara; Hiromu Hirai, Tsukuba; Teruyoshi Higashiya, Odawara, all of Japan

[73] Assignee: Hitachi, Ltd., Tokyo, Japan

[21] Appl. No.: 549,285

[22] Filed: Oct. 27, 1995

[30] Foreign Application Priority Data

Nov. 1, 1994 [JP] Japan .................. 6-268574

[51] Int. Cl.$^6$ .................. G11B 13/00; G11B 17/22
[52] U.S. Cl. .................. 369/14; 369/30
[58] Field of Search .................. 369/14, 15, 13, 369/30, 34, 36, 292; 300/137

[56] References Cited

U.S. PATENT DOCUMENTS

| | | | |
|---|---|---|---|
| 5,189,578 | 2/1993 | Mori et al. .................. | 360/106 |
| 5,255,260 | 10/1993 | Yamada et al. .................. | 369/36 |
| 5,313,617 | 5/1994 | Nakano et al. .................. | 395/500 |
| 5,465,382 | 11/1995 | Day, III et al. .................. | 395/404 |

OTHER PUBLICATIONS

"A Quarter Century of Disk File Innovation", J.M. Harker, et al., IMB J. Res. Develop. vol. 25, No. 5, Sep. 1981.

*Primary Examiner*—Tan Dinh
*Attorney, Agent, or Firm*—Kenyon & Kenyon

[57] ABSTRACT

Magnetic disk unit 1 is connected to personal computer 400 through recording mode selecting means 2, and recording mode selecting means 2 can select one of 3 recording modes (high reliability, large capacity, and high speed) and magnetic disk unit 1 records information with the recording method selected by recording mode selecting means 2. The controllability of the magnetic disk unit 1 and personal computer 400 is improved significantly by selecting the most suitable recording method according to the characteristics of information to be recorded.

3 Claims, 11 Drawing Sheets

STORAGE DEVICE CAPABLE OF USING BOTH OPTICAL AND MAGNETIC DISK UNITS FOR STORING INFORMATION DATA

BACKGROUND OF THE INVENTION

This invention relates to a storage system used as an external storage system for computers, particularly to a magnetic disk unit the recording capacity, reliability, and access speed of which are variable, or to a personal computer used as a storage system that can select an external storage system having recording capacity, reliability, and access speed properties different from those of the current one.

Each of the conventional magnetic disks has recorded/reproduced every type of information with one method (quality and reliability); the recording/reproducing method is not changed according to the type (difference) of object information. Any one of those magnetic disk units cannot change its characteristics so that it can use the most suitable recording system (method) selected according to the type of object information.

For example, as shown clearly in J. M. Harker, et al, *A Quarter Century of Disk File Innovation*, IBM J.Res.Develop, Vol.25 (1981), p.667, etc., characteristics of a magnetic disk unit are fixed and its recording characteristics cannot be changed according to the type of object information.

Concretely, such a magnetic disk unit is used with the same reliability (low recording/reproducing error rate) to cope with (1) numerical data that requires high reliability and (2) image data that does not require as high a reliability as the numerical data, but requires large capacity. As a result, they cannot record mass information. Furthermore, they record both data that requires high speed property and data that does not require such high speed property with the same storage characteristics. This is why they are limited in their high speed recording/reproducing performance.

SUMMARY OF THE INVENTION

An object of the invention is to record and reproduce with the most suitable method for the characteristics of the object information. In other words, the properties (recording capacity, reliability, and access speed) of the subject magnetic disk unit are changed so that the unit can be used most effectively.

Concretely, information to record is classified into the following types (1) data that requires high reliability, (2) data that requires large capacity, (3) data that requires high speed, and (a) the characteristics of the subject magnetic disk are changed most suitably to record the type of the object information and use the disk unit most effectively, or (b) one magnetic disk unit is provided with multiple magnetic disks and magnetic heads or optical disks and optical heads, each of which has characteristics different from those of others so that the most suitable disk (recording medium) and head (recording means) can be selected according to the type of information to be recorded, optimizing the recording method of the magnetic disk unit appropriately to the type of information.

The personal computer incorporating the magnetic disk unit in it allows information to be recorded in the most suitable recording unit selected from multiple magnetic disk units, optical magnetic disk units, or IC card memories provided in its form the factor according to the characteristics of the information to be recorded.

Another object of the invention is to provide the most suitable recording unit to meet the user's need by changing the combination of recording units in the form factor.

Furthermore, another object of the invention is to provide a high speed transfer magnetic disk unit indispensable to transfer mass data such as image information.

According to the invention, the mode to record information is roughly classified into 3 types;
(1) high reliability mode,
(2) large capacity mode, and
(3) high speed mode.

The following 3 methods are available to realize those 3 modes.
(a) Method that changes the characteristics of both the magnetic head and magnetic disk of a magnetic disk unit to cope with the type of object information,
(b) method that provides multiple magnetic heads and magnetic disks or optical heads and optical disks, each of which has characteristics different from those of others, in a magnetic disk unit, and
(c) method that combines multiple magnetic disk units or mixes magnetic disk units, optical disks, and/or semiconductor memories, each of which has characteristics different from those of others, in a standardized space (form factor) for mounting a magnetic disk of the computer.

At first, means that will realize
(1) high reliability mode,
(2) large capacity mode, and
(3) high speed mode
by changing the characteristics of both magnetic head and magnetic disk of a magnetic disk unit will be explained below.

(I) In order to realize high reliability, recording/reproducing corresponding to high reliability mode:
(1) the same information is written on two or more different magnetic disks,
(2) correction information, such as parity to check information matching, is written together with object information.

To read information from a disk,
(i) the multiple-written information or
(ii) error correction information, such as parity, is used to improve the high reliability of information.

(II) In order to cope with large capacity mode, recording/reproducing:
(1) (a) a high frequency is used for the magnetic head to write data on the magnetic disk or
(b) the clearance between the magnetic head and magnetic disk is reduced to improve the recording density (BPI) in the circumferential direction.
(2) (a) a high precision positioning servo disk (signal) is used together with a normal mode one or
(b) a high precision positioning servo disk (signal) is used together with a normal mode one to improve the recording density (TPI) in the radial direction.

(III) In order to realize the high speed mode, a high speed positioning mechanism is used together with a normal mode one or the thrust force of the positioning mechanism is set larger to speed up the positioning.

In the method that provides multiple magnetic heads and magnetic disks or optical heads and optical disks, each of which has characteristics different from those of others, in one magnetic disk unit, (1) data is written with the magnetic head means mounted on the slider having the longer distance (rising height) from the magnetic disk to cope with high reliability mode recording/reproducing. In this case, if the rising height value is large, the magnetic head means does not come in contact with the magnetic disk even when the rising height is changed for any reason, assuring high reliability of the recording/reproducing.

(2) data is written with the magnetic head means mounted on the slider having the shorter distance (rising height) from the magnetic disk to cope with large capacity mode recording/reproducing. In this case, if the rising height value is small, recording/reproducing is possible even when a high frequency is used for the magnetic head means to write data on the magnetic disk, so that a high TPI is assured or data can be written on the optical disk to cope with larger capacity mode than that of the magnetic disk.

(3) In order to cope with the high speed mode recording/reproducing, for example, multiple magnetic head means are provided for a magnetic disk surface to reduce the area used by a magnetic head (traveling distance) for recording/reproducing. With this, the high speed mode is available without using any special positioning mechanism and magnetic head means.

In the method that combines multiple magnetic disk units, each of which has characteristics different from those of others, in the standardized space for a magnetic disk unit (form factor) of the computer, or those magnetic disk units are combined with optical disk units and/or semiconductor memories, (1) same data is recorded on multiple disks or data is recorded on a high reliability magnetic disk to cope with high reliability mode recording/reproducing;

(2) data is recorded/reproduced in/from an optical disk unit or a large capacity magnetic disk unit to cope with large capacity mode recording/reproducing.

(3) the semiconductor memory is used to cope with the high speed mode recording/reproducing. As mentioned above, recording units, each of which has characteristics different from those of others, are combined in the form factor to allow the most suitable recording/reproducing to be selected according to the characteristics of information to be handled if the form factor is regarded as a recording unit. To make this selection easier, common connectors are used for magnetic disk units, semiconductor memories, and optical disk units to be mounted in the form factor. Especially, this selection is easier for 1.8-inch magnetic disks and semiconductor memories, since their connectors are standardized and compatible.

In order to improve the information transfer speed of the computer in which the magnetic disk unit or optical disk unit is mounted, the rotation speed of such magnetic disk unit or optical disk unit is increased. With this, data can be read faster, and the rotational delay of the disk unit can be reduced for high speed data transfer.

As mentioned above, the maximum performance of the magnetic disk unit can be brought out by selecting the characteristics (1) high reliability mode, (2) large capacity mode, or (3) high speed mode of the magnetic disk according to the characteristics of the object information.

In case of the conventional magnetic disk units, they have demanded all of high reliability, large capacity, and high speed data access properties at the same time. Thus, their characteristics cannot help but become average ones. On the other hand, according to this invention, the characteristics of the magnetic disk unit can be selected appropriately in accordance with the characteristics of the object information to obtain the most suitable method for recording/reproducing.

For example, (1) a high reliability magnetic disk unit is selected for recording numeric data, (2) a large capacity magnetic disk unit is selected for recording image data, and (3) a high speed magnetic disk unit is selected for recording data that must be accessed at high speeds for the most suitable recording of information.

Furthermore, multiple magnetic heads and magnetic disks, each of which has characteristics different from those of others, may also be combined in a magnetic disk unit or multiple magnetic disk units and/or optical disk units, each of which has characteristics different from those of others, may be combined in the form factor to select the most suitable recording method according to the characteristics of the object information.

DETAILED DESCRIPTION

Figure 1:
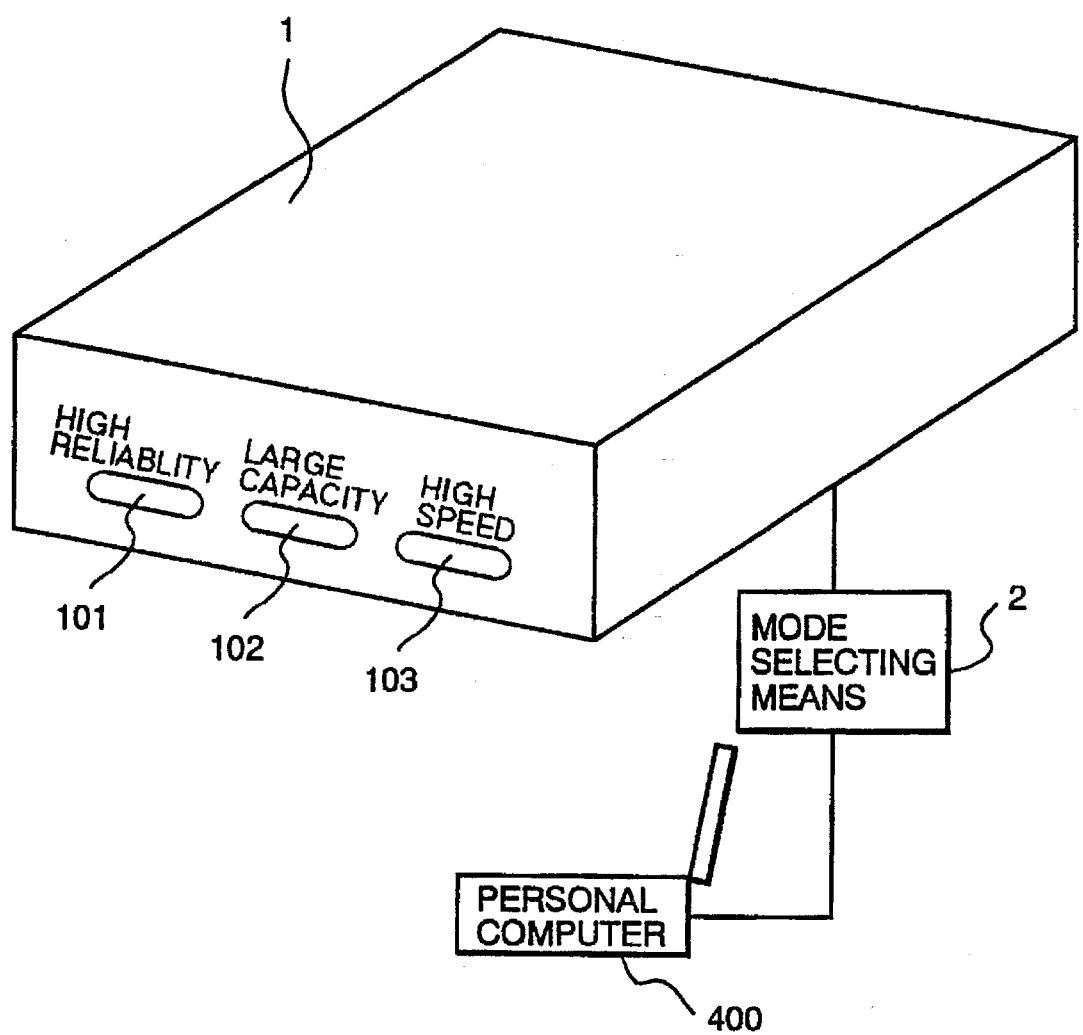
FIG. 1 is an external view of the magnetic disk unit used in the first embodiment of the invention.
Figure 2:
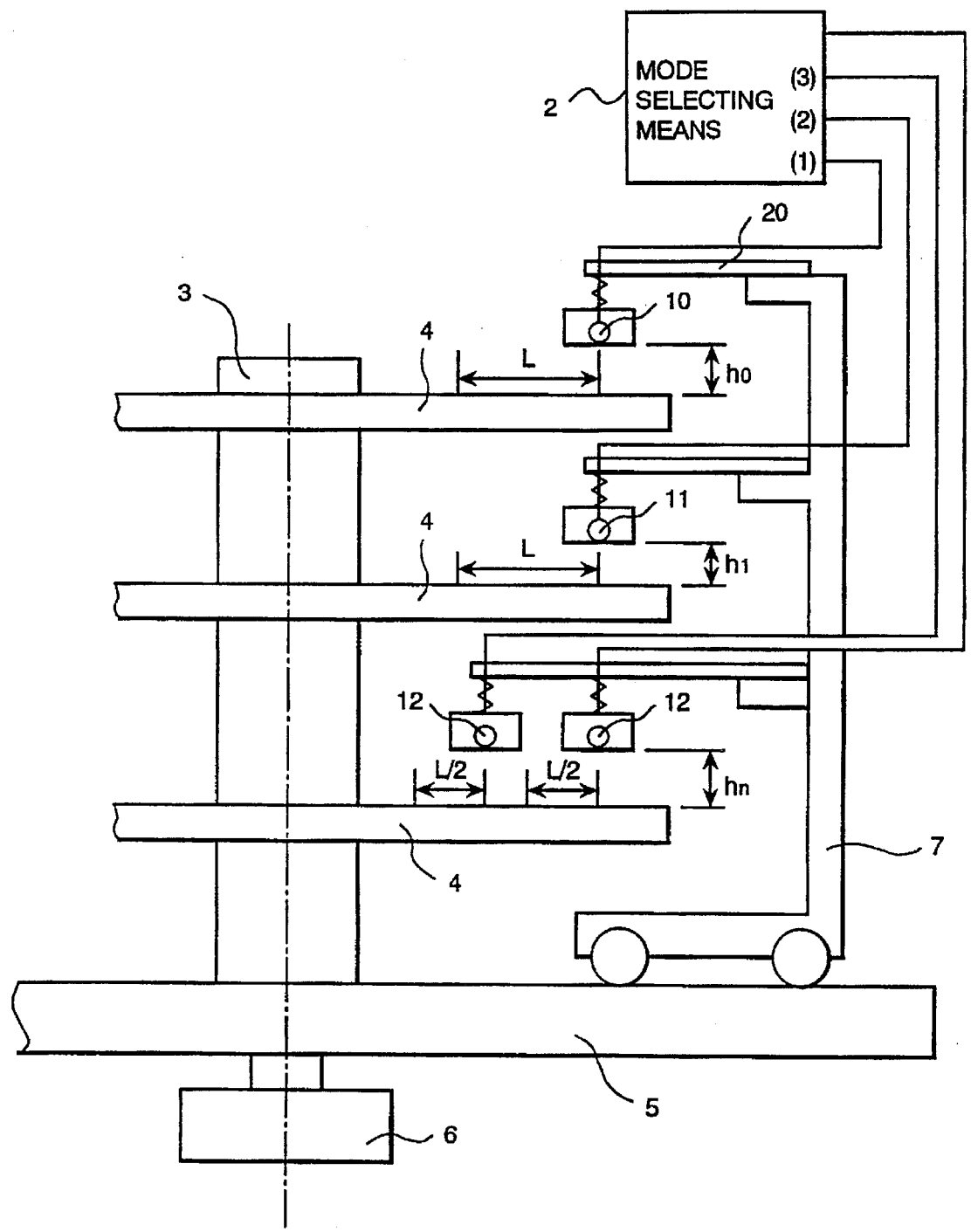
FIG. 2 is a view showing the core portion in the first embodiment of the invention.
Figure 3:
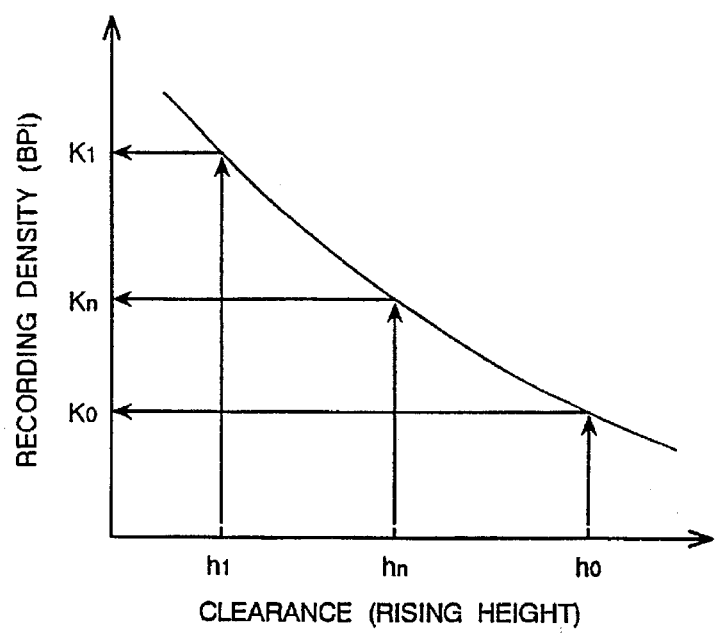
FIG. 3 is a view explaining of the functions used in the first embodiment of the invention.
Figure 4:
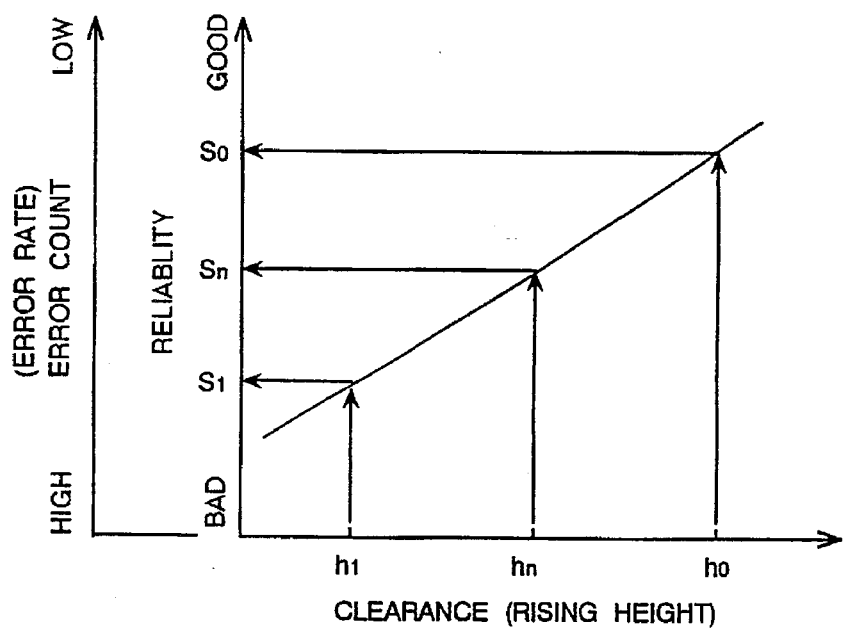
FIG. 4 is a view explaining of the functions used in the first embodiment of the invention.
Figure 5:
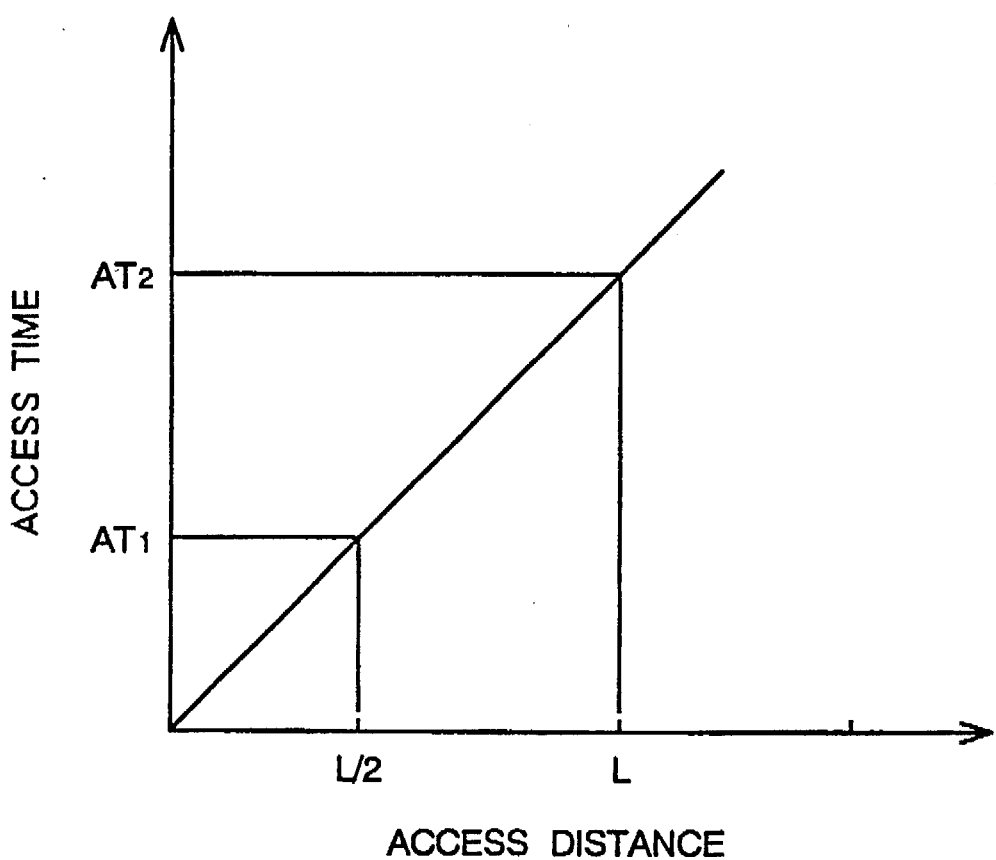
FIG. 5 is a view explaining of the functions used in the first embodiment of the invention.

The first embodiment of this invention will be explained below using FIGS. 1 through 5. FIG. 1 shows the external view of the magnetic disk unit of this invention. FIG. 2 shows the concept of the mechanism of said magnetic disk unit. FIGS. 3 through 5 explain the functions of the magnetic disk unit.

As shown in FIG. 1, magnetic disk unit 1 is connected to personal computer 400 through recording mode selecting means 2. The recording mode selecting means 2 is provided outside magnetic disk unit 1 in this embodiment, but it may be incorporated in the magnetic disk unit 1. Magnetic disk unit 1 in this embodiment is provided with recording mode indicator lamps 101, 102, and 103 used to indicate the three types of recording modes (high reliability, large capacity, and high speed). Those lamps 101 to 103 are connected to the recording mode selecting means 2. Each of those lamps 101 to 103 comes on for the corresponding recording mode selected by the selecting means 2.

FIG. 2 shows the concept of the mechanism of the magnetic disk unit 1 shown in FIG. 1. The recording mode selecting means 2 selects one of (1) high reliability mode, (2) large capacity mode, and (3) high speed mode. The recording mode selecting means 2 may be a system in which the user selects one of the modes with a selector or a system in which signals from the personal computer 400 are used to select one of the modes.

If the recording mode selecting means 2 selects (1) high reliability mode, high reliability magnetic head means 10 records/reproduces information on/from the surface of magnetic disk 4.

If the recording mode selecting means 2 selects (2) large capacity mode, large capacity magnetic head means 11 records/reproduces information on/from the surface of magnetic disk 4.

If the recording mode selecting means 2 selects (3) high speed mode, high speed magnetic head means 12 records/reproduces information on/from the surface of magnetic disk 4.

When the magnetic disk 4 operates, the clearance (rising height) between high reliability magnetic head 10 and magnetic disk 4 becomes $h_o$, which is greater than the rising height $h_n$ of normal magnetic head means (not illustrated) used in the normal mode. The rising height $h_l$ of the large capacity magnetic head 11 is smaller than the rising height $h_n$ of the normal magnetic head. The relationship between rising height value and line recording density (BPI: Bit Per Inch) is as shown in FIG. 3; the less the rising height is set, the more the recording density can be improved. Concretely, if the line recording density for rising height $h_n$, is assumed to be $K_n$ and the line recording density for $h_l$ and $h_o$ are assumed to be $K_l$ and $K_0$, respectively, then the relationship between rising density and line recording density will be as shown below.

$$h_l < h_n < h_o \quad (1)$$

$$K_l > K_n > k_o \quad (2)$$

In other words, since the rising height $h_i$ of large capacity magnetic head means 11 is smaller than $h_n$ of normal magnetic head means, the recording density $K_n$ of large capacity magnetic head means can be set larger than $K_n$ of normal magnetic head means. On the other hand, since the rising height $h_0$ of high reliability magnetic head means 10 is larger than $h_n$ of normal magnetic head means, the recording density is smaller than $K_n$ of normal magnetic head means.

FIG. 4 shows the relationship between rising height and reliability (comprehensive index of recording/reproducing error count, error rate, and working life). As shown below, the less the rising height is set, the lower the reliability becomes.

$$h_l < h_n < h_o \quad (1)$$

$$S_l < S_n < S_o \quad (3)$$

Thus, the most suitable method can be selected to record information on the magnetic disk by selecting the most suitable magnetic head according to the type of information to be recorded. More in detail, the most suitable magnetic head means may be selected from those shown in Table 1 according to the characteristics of the information to be recorded.

TABLE 1

|  | Recording Capacity | Reliability | Information Type |
|---|---|---|---|
| Magnetic head means 10 | Δ | ⊙ | High reliability information (numerics, etc.) |
| Magnetic head means 11 | ⊙ | Δ | Large capacity information (image data, etc.) |

Two magnetic head means 12 are provided on one magnetic disk surface. This is why the access distance of magnetic head means 12 is only a half of (L) (i.e., L/2) of high reliability magnetic head means 10 or one large capacity magnetic head means 11 is provided only on its magnetic disk surface. And this is why information can be recorded/reproduced on/from the magnetic disk surface even when the two magnetic head means 12 are provided for the same positioning mechanism 7. There do not necessarily have to be two magnetic head means 12, although two means are used in this embodiment. If the number of magnetic head means 12 per disk surface is set at more than that of normal magnetic head means, the access distance of magnetic head means 12 can be shortened and information can be accessed more speedily. FIG. 5 shows the relationship between access distance and access time. If the access distance is set to ½, the access time can be reduced to about ½.

Figure 6:
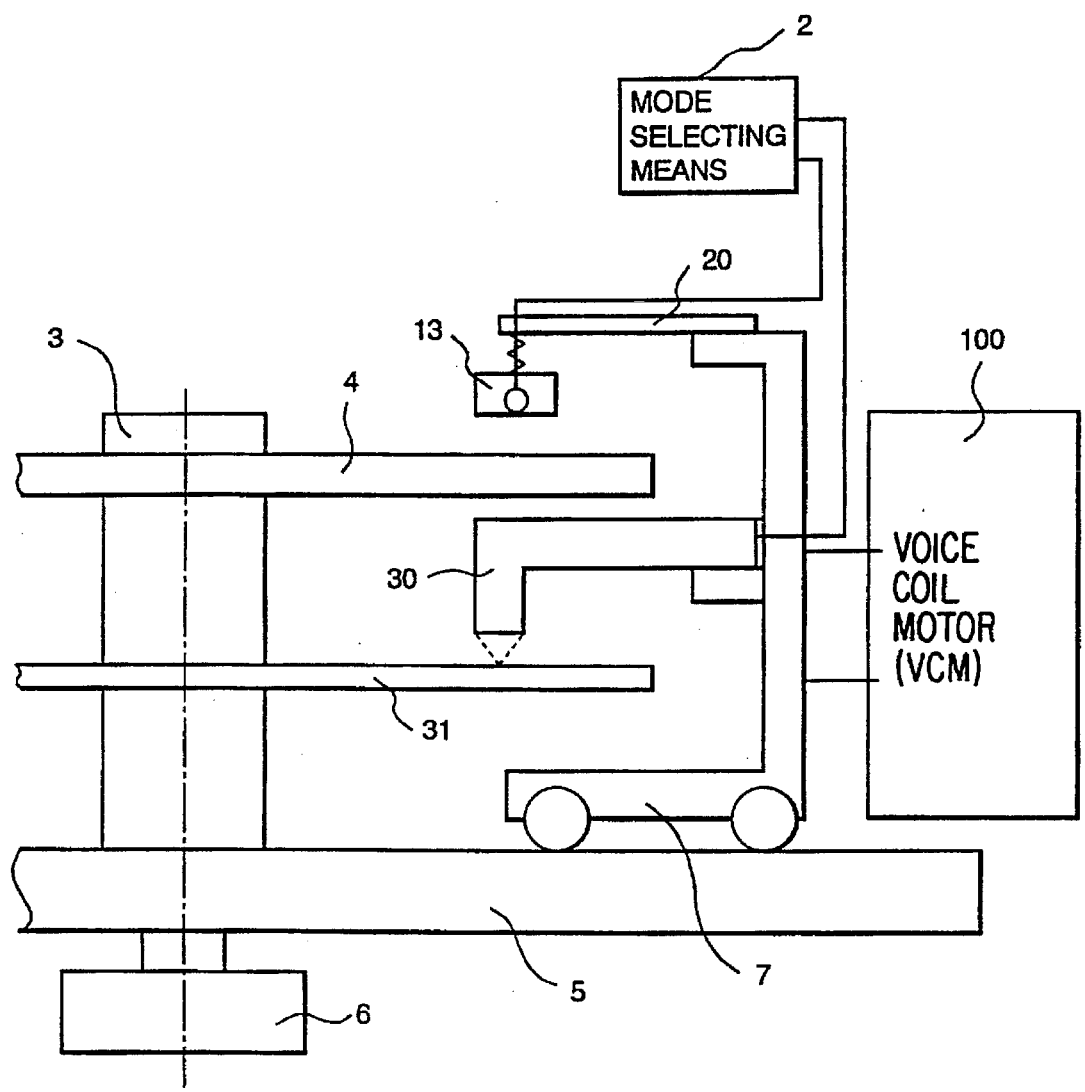
FIG. 6 is a view showing the core portion in the second embodiment of the invention.

The second embodiment of this invention will be explained below using FIG. 6. The difference from the first embodiment is that the magnetic disk unit incorporates an optical disk and an optional head means in addition to the magnetic disk and magnetic head means in this embodiment. Optical disk 31 is laminated to the same spindle 3 as that of magnetic disk 4. Magnetic head means 13 is provided above magnetic disk 4 and optical head means 30 is provided above optical disk 31. Both magnetic head means 13 and optical head means 30 are connected to recording mode selecting means 2.

If recording mode selecting means 2 selects (1) high speed mode, data is saved on magnetic disk 4 by magnetic head means 13. If recording mode selecting means 2 selects (2) large capacity mode, data is saved on optical disk 31 by optical head means 30. In this embodiment, both magnetic head means 13 and optical head means 30 are connected to the same positioning mechanism 7 and driven by a voice coil motor 100 to be positioned at the specified position in the radial direction. However, those head means 13 and 30 may also be connected to different positioning mechanisms separately.

Generally, compared with an optical disk unit (combination of an optical head and an optical disk), a magnetic disk unit (combination of a magnetic head and a magnetic disk) is excellent in data accessing performance. The optical disk unit is more excellent an large capacity property than that of the magnetic disk unit. Information such as numerics, etc., that must be accessed at high speeds, therefore, is saved on magnetic disks, while information such as image data, etc. that require a large capacity, is saved on optical disks. In other words, those two types of storage units are selected appropriately to suit the selected type of information. In this second embodiment, if the most suitable saving method (recording/reproducing method) is selected according to the characteristics of the object information, both (1) high speed accessing requirement and (2) large capacity recording requirement, which cannot be realized in the conventional magnetic disks, can be satisfied equally as mentioned above.

Figure 7:
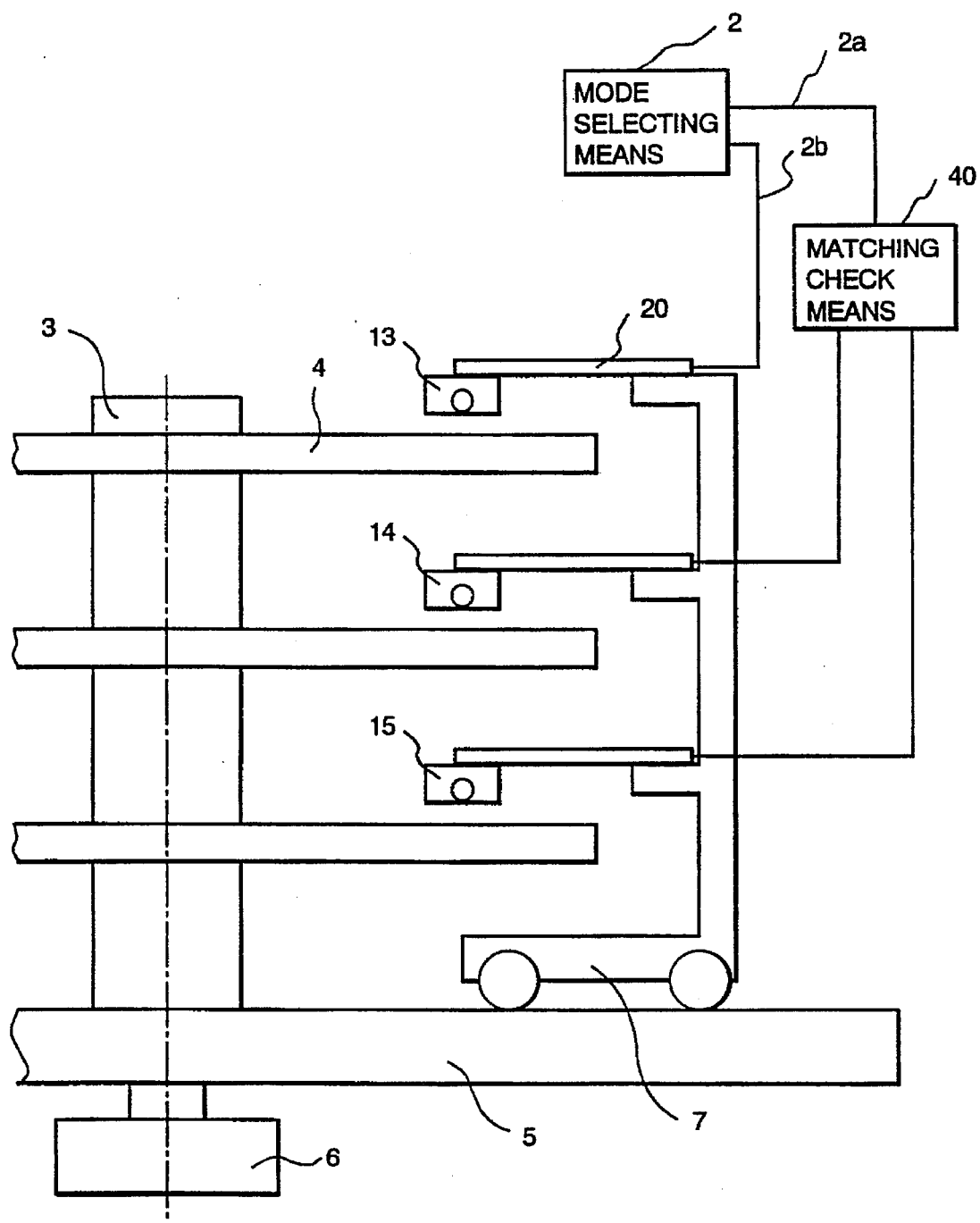
FIG. 7 is a view showing the core portion in the third embodiment of the invention.

The third embodiment of this invention will be explained below using FIG. 7. The difference from the first embodiment is that in this embodiment, the recording mode selecting means 2 can handle information only in two modes: (1) normal mode and (2) high reliability mode. If (2) high reliability mode is selected, the same information is written on two disks by two magnetic head means (high reliability magnetic head means 1 and 2) from high reliability mode cable 2a through matching check means 40. Information is read from those two disks by the two high reliability magnetic heads, then checked for matching (correctness) by the matching check means 40 and transferred to the personal computer (not illustrated) through the recording mode selecting means 2. In this case, the information to be transferred to the two high reliability magnetic heads from the matching check means 40 may be completely the same, or original information may be recorded on one disk and error correcting information, such as parity used to check matching of information, may be recorded on the other disk. In such a case, since information can be recorded on different two magnetic disks by different two magnetic heads (dualization of information), the recording reliability can be improved. Therefore, if one of the two magnetic disks or magnetic head means is damaged, information can be recorded/reproduced. And this will improve the reliability of recording/reproducing significantly due to the dualized recording/reproducing routes.

Figure 8:
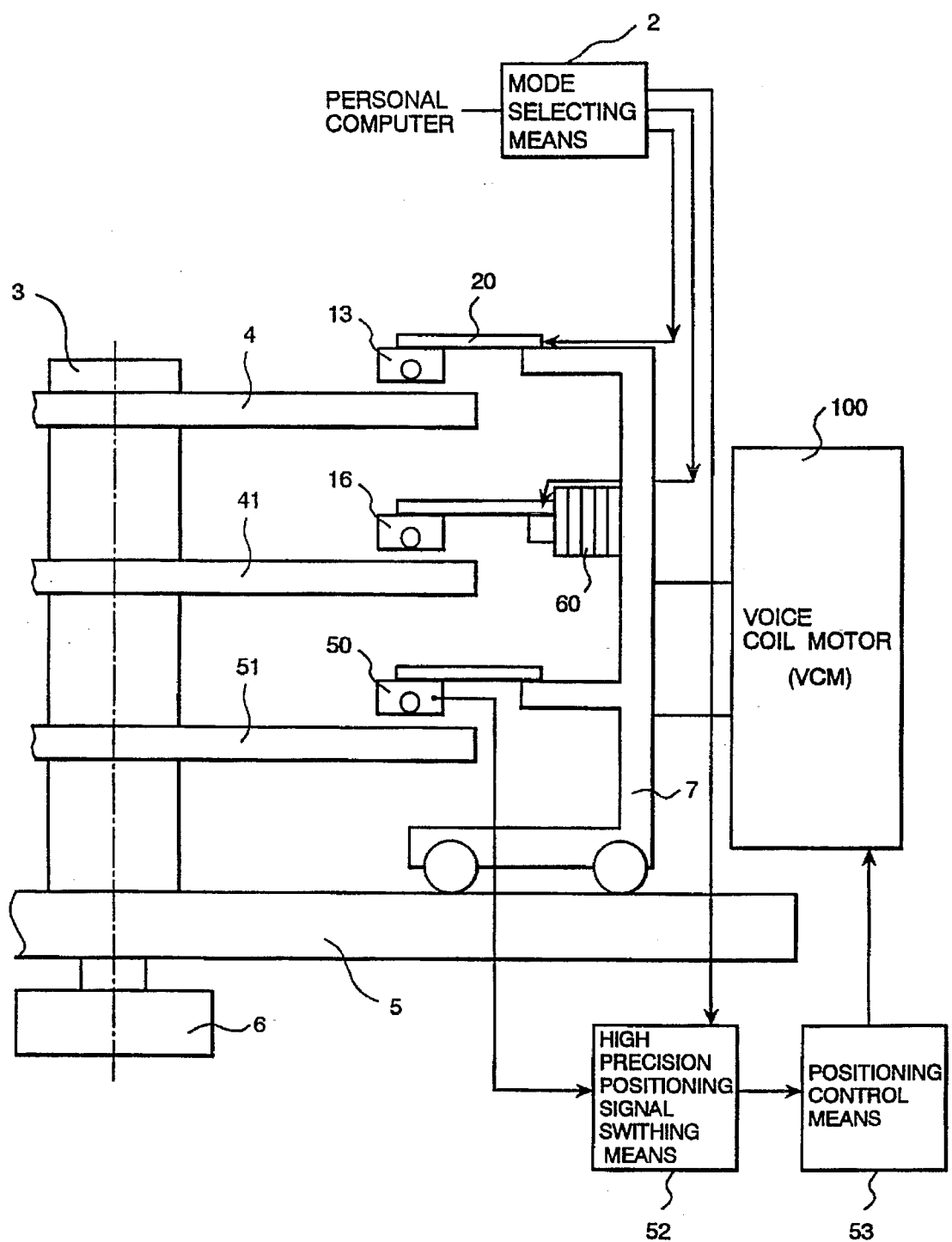
FIG. 8 is a view showing the core portion in the fourth embodiment of the invention.

The fourth embodiment of this invention will be explained below using FIG. 8. The difference from the first embodiment is that in this embodiment, information is recorded in one of (1) normal mode, (2) high speed/large capacity mode, and (3) large capacity mode selected by the recording mode selecting means 2. This embodiment is especially featured by the mode (2) in which both high speed accessing and large capacity requirements are satisfied concurrently. In addition, just like in the first embodiment, the large capacity recording requirement is also satisfied by using (3) large capacity mode.

In this embodiment, if (1) normal mode is selected, information is recorded on magnetic disk 4 by magnetic head means 13. When positioning magnetic head means 13 on a specified point in the radial direction of magnetic disk 4, servo magnetic head means 50 detects position signals from servo magnetic disk 51, then positioning control means 53 drives a voice coil motor (VCM) 100 according to detected position signals and drives positioning mechanism 7 which finally positions the magnetic head means 13. This is why the recording density on tracks (TPI, Track Per Inch) in the radial direction of the disk on which information is to be recorded by the same magnetic head means 13 depends significantly on the accuracy of the position signals from the servo magnetic disk 51. If (1) normal mode is selected, normal position signals are issued from the servo magnetic disk 51.

If (2) high speed/large capacity mode is selected, information is recorded on high speed/high precision magnetic disk 41 by high speed/high precision magnetic head means 16 connected to high speed/high precision positioning means 60. In this embodiment, a piezo-actuator is used as the high speed/high precision positioning means 60. It may not be necessarily a piezo-actuator. The piezo-actuator, when applied a voltage, becomes elastic quickly. There is a good correlation between applied voltage and elastic value. This is why the piezo-actuator is the most suitable for the high speed and high precision positioning means. On the other hand, the piezo-actuator, which is the most suitable for high precision positioning because of its very small elastic value, is not suitable for a long movement (a long distance access) such as a movement from the innermost position to the outermost position of a disk. This disadvantage of the piezo-actuator can be eliminated, however, by using VCM, which is excellent in its performance of long-distance movement. Thus, it becomes possible to position the magnetic head means 16 at high precision. As mentioned above, the use of high precision positioning means 60 mounted over the normal positioning means makes it possible to record information that requires high speed and large capacity properties.

If (3) large capacity mode is selected, information from the personal computer is transferred to magnetic head means 13 from recording mode selecting means 2, then written on magnetic disk 4. At the same time, the recording mode selecting means 2 switches signals read by servo magnetic head 50 from servo disk 51 to high precision mode signals using high precision positioning signal switching means 52. This makes it possible to control the drive current flown from positioning control means 53 to voice coil motor (VCM) at high precision, as well as to position magnetic head means 13 on the specified position in the radial direction of magnetic disk 4, and improve the recording density of tracks (TPI) in the radial direction.

Therefore, if, when (1) normal mode is selected, the current to be flown to VCM to move magnetic head means 13 only by one track in the radial direction is assumed to be 1, and the current to be flown to VCM when (3) large capacity mode is selected is assumed to be 0.5, respectively, then magnetic head means 13 can be moved only by 0.5 track in the radial direction of the disk. This makes it possible to increase the recording density of the disk in the radial direction to double that of (1) normal mode. In such a way, TPI can be improved easily even when same magnetic means 13 is used if the accuracy of positioning in the radial direction of VCM is improved. And, this also makes it possible to use only one magnetic head means in both (1) normal mode and (3) large capacity mode. In this embodiment, therefore, productivity will be more improved than in the first embodiment.

Figure 9:
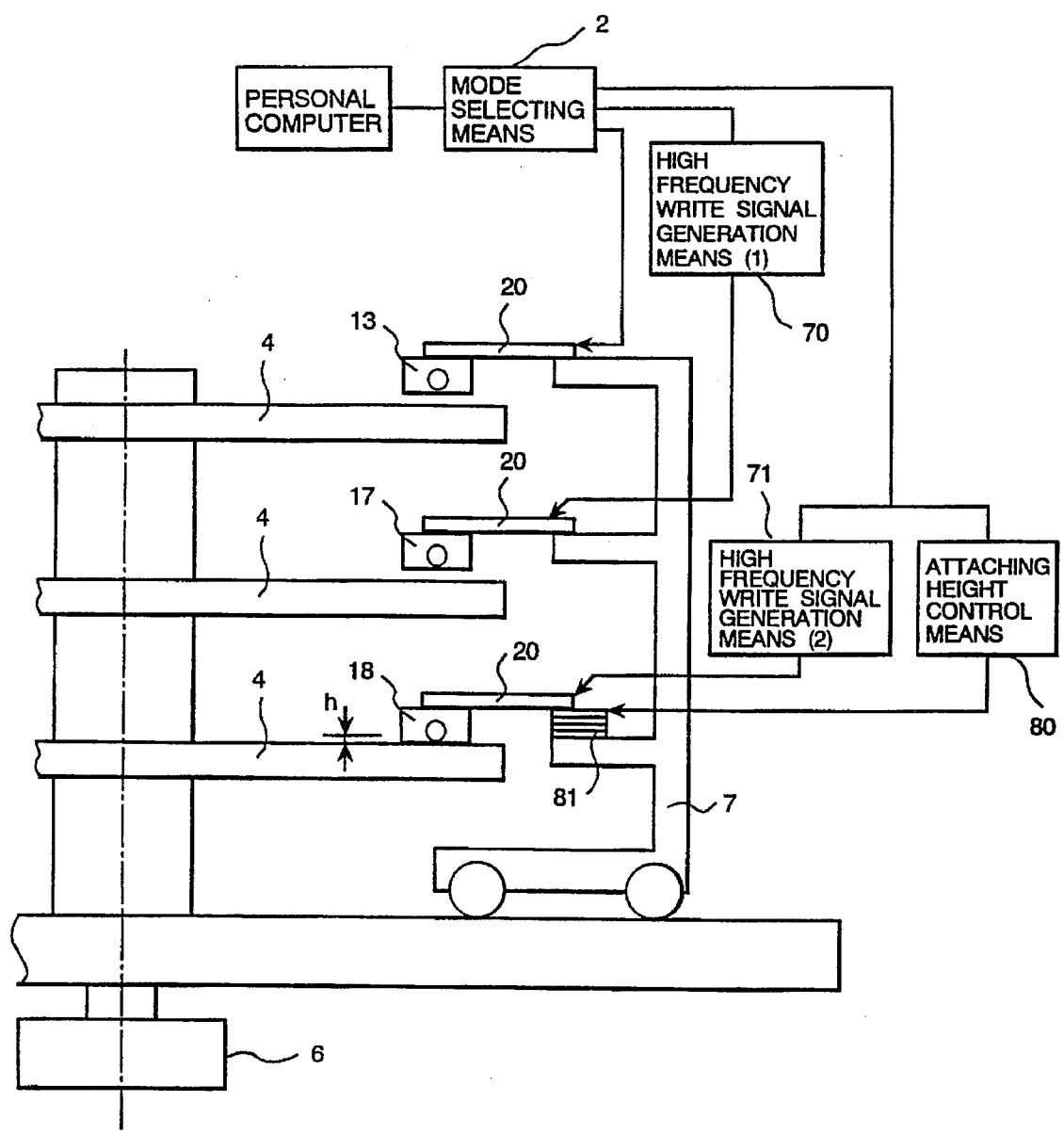
FIG. 9 is a view showing the core portion in the fifth embodiment of the invention.

FIG. 9 shows the 5th embodiment of this invention. The differences from the first embodiment is that in this embodiment, the recording mode selecting means can handle three modes; (1) normal mode, (2) large capacity mode, and (3) very large capacity mode.

If (1) normal mode is selected, information that is normal write signals (normal write frequency) is recorded on magnetic disk 4 by magnetic head means 13.

If (2) large capacity mode is selected, information is written by large capacity magnetic head means (1) 17 according to high frequency signals from high frequency write signal generation means (1) 70. If the rotation speed of the magnetic disk is the same, the higher the write frequency is set, the higher the recording density becomes when recording information from magnetic head to magnetic disk. This is why it is easier to obtain high line recording density (BPI) in this embodiment even when the same magnetic head and disk as those of the normal mode are used. In this embodiment, the same magnetic disk as that of the normal mode is used as a magnetic disk corresponding to large capacity magnetic head means (1) 17, but, needless to say, the magnetic disk may be the one more appropriate to high line recording density (high BPI).

If (3) very large capacity mode is selected, information is written on magnetic disk 4 by large capacity magnetic head means (2) 18 with very high frequency signals from high frequency write signal generation means (2) 71. As mentioned above, if the rotation speed of magnetic disk 4 is the same, the higher the write frequency is set, the higher the recording density becomes when recording information from magnetic head onto magnetic disk. In case of large capacity magnetic head (1) 17, however, since it would keep a fixed clearance (rising height) from magnetic disk at the same point in the radial direction, it is limited to make the write frequency higher. This is because the magnetic field leaking from magnetic head means spreads out and the space to write one bit on magnetic disk cannot be reduced over a certain value. This is true even when a high frequency is used to write information on magnetic disk if the rising height value of the magnetic head is large. Furthermore, if a higher write frequency is used to record signals, the read error rate may become higher than the allowable value if the same rising value of magnetic disk as that of the normal mode is assumed.

To prevent this, the rising height of large capacity magnetic head 18 (2) is reduced using attaching height change means 81 to adjust the height to attach magnetic head support mechanism 20 and its control means 80 when information is to be written on magnetic disk 4 with very high frequency signals from large capacity magnetic head means (2) 18. Attaching height change means 81, for example, may be something like a laminated piezoelectric element. Since a laminated piezoelectric element becomes elastic quickly corresponding to an applied voltage, the rising height h of magnetic head means 18 can be controlled by controlling the voltage to apply using attaching height change means 81. As FIG. 3 clarifies the relationship between rising height h and recording density (BPI), it is well known that reduction of the rising height h can improve BPI.

As a result of the above, if (3) large capacity mode is selected, information is written on magnetic disk 4 by magnetic head means 18 with high frequency signals from high frequency write signal generation means (2) 71. At the same time, the rising height of magnetic head means 18 can be reduced to allow a jump in the expansion of storage capacity using attaching height control means 80 and attaching height change means 81. In this embodiment, the storage capacity can be expanded significantly without changing (using the same) magnetic head means that is the most expensive component of the magnetic disk unit, its support mechanism, and magnetic disk. The cost of the magnetic disk unit can thus be controlled to be low.

Figure 10:
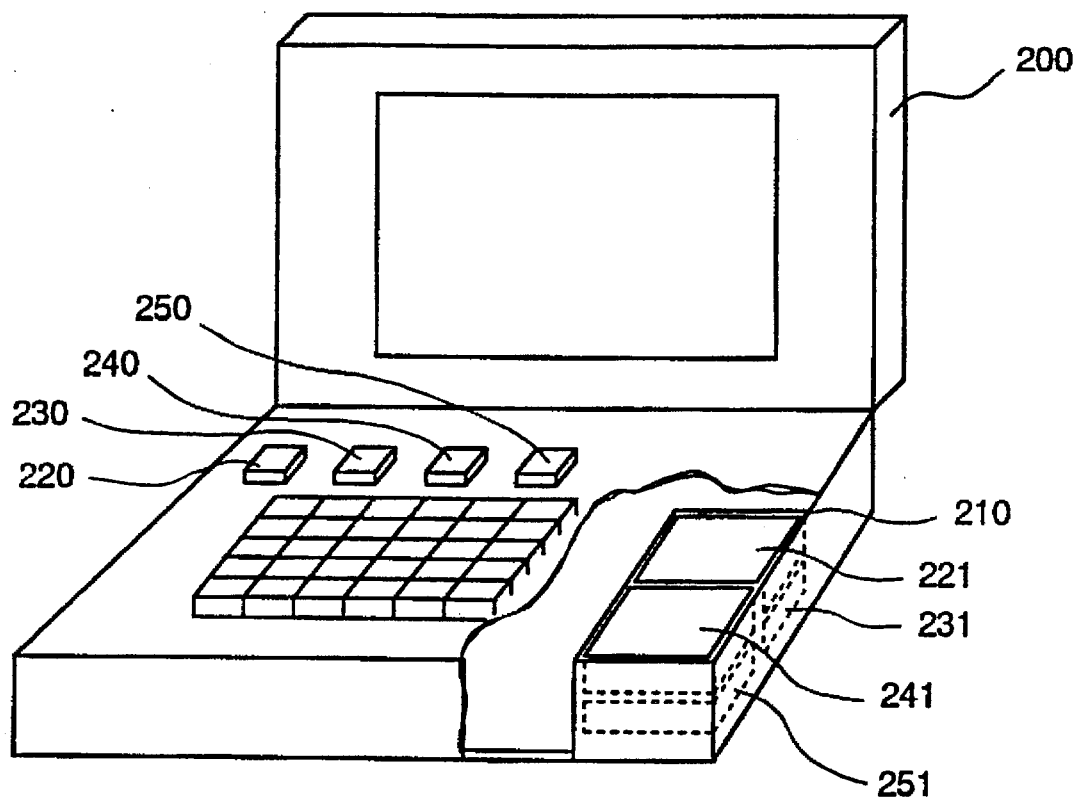
FIG. 10 is a perspective view of a personal computer incorporating the sixth embodiment of the invention.

The 6th embodiment of this invention will be explained below using FIGS. 10 and 11. As shown in FIG. 10, the personal computer 200 of this invention is provided with four selection keys 220, 230, 240, and 250 used to select (1) normal mode, (2) high speed mode, (3) large capacity mode, and (4) very high speed/shock resistance mode. The personal computer is also provided with a standardized space (form factor) 210 for only one 3.5" magnetic disk drive (height: 25 mm). The form factor is actually used to mount three 2.5" magnetic disk drives (height: 10 mm) and an IC card memory 251. The three 2.5-inch" magnetic disk drives are a normal magnetic disk 221, a high speed access magnetic disk 231, and a large capacity magnetic disk drive 241.

Figure 11:
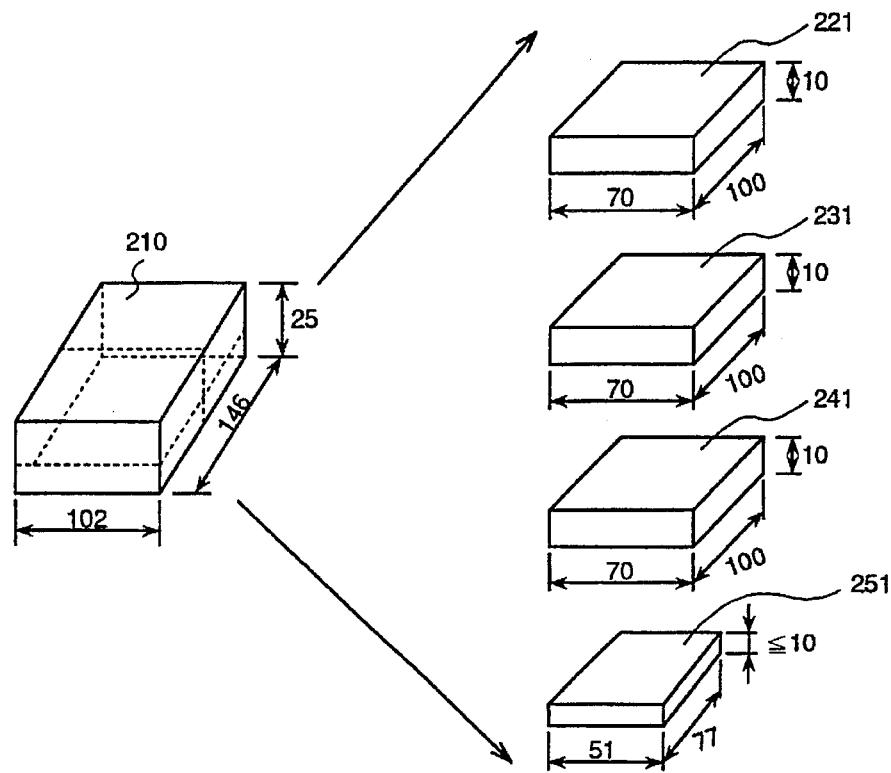
FIG. 11 shows perspective views of the sixth embodiment of the invention illustrating the mounting of a 2.5-inch magnetic disks and an IC card memory within the available 3.5-inch form factor.

FIG. 11 explains in more detail how to mount those 2.5-inch magnetic disks and an IC card memory 251 in the form factor 210. As FIG. 11 shows external dimensions of the 2.5-inch magnetic disks, the 3.5-inch magnetic disk drive form factor 210 has a space enough to mount those four devices. This form factor is usually used for a magnetic disk drive whose height is 1 inch, but it may be a form factor whose height is 41 mm. In this case, the form factor can mount eight 2.5-inch magnetic disk units as shown in FIG. 11.

In this embodiment, the form factor is not used to mount four 2.5-inch magnetic disk units, but used to mount only three 2.5-inch magnetic disks, each of which has characteristics different from those of others and an IC card memory 251. The standard IC memory card is 51×77×3 to 10 mm in size. Since such an IC card memory is a size smaller than the external size of the 2.5-inch magnetic disk unit, three 2.5-inch magnetic disk units and an IC card memory can be mounted in a 3.5-inch magnetic disk form factor (height: 25 mm).

Next, the information recording method will be explained. As shown in FIG. 10, personal computer 200 is provided with four recording mode selection keys. The user can thus select the most suitable recording means according to the type of information to be handled. Therefore, (1) normal mode selection key 230 can be used to record normal information, (2) high speed mode selection key 230 can be used to record information at high speeds, (3) large capacity mode selection key 240 can be used to record information that needs a large capacity, and (4) very high speed/shock resistance mode selection key 250 can be used to record/ reproduce information at very high speeds or when shock must be avoided to record information. This embodiment can allow the user to select the most suitable recording method according to the type of information to be handled.

Compared with the conventional method to record information, that is, the method using only one 3.5-inch magnetic disk unit for recording every type of information (multi-type information), this embodiment is very flexible; the most suitable recording method (unit) can be selected from the types of recording methods (units) according to the characteristics of information to be handled. In other words, if three magnetic disk units and an IC card memory mounted in a form factor are assumed to be one recording unit, then this invention can supply a recording unit that satisfies all of high speed, large capacity, and shock resistance requirements. The user of a personal computer can select the most suitable recording method (unit) according to the characteristics of information to be handled. This makes it possible to improve the comprehensive performance and controllability of the recording unit significantly.

If the user can combine the recording devices or change the combination of those recording devices freely in the form factor, the recording system will become the most suitable for the user's work environment.

Therefore, if information that requires (1) high speed property is to be handled, all the recording devices in the form factor can be replaced with high speed magnetic disk units and/or IC card memories to change the storage system to a very high speed storage system. Use of IC card memories can also improve the shock resistance property of the recording system significantly.

If information that requires (2) large capacity property is to be handled, all the recording units in the form factor can be replaced with large capacity magnetic disk units and/or an optical magnetic disk unit to change the storage system to a large capacity storage one.

Furthermore, if information that requires (3) high reliability is to be handled, all the recording units in the form factor can be replaced with high reliability magnetic disk units or same information is written in multiple magnetic disks (mirror disks are provided) or error correction data such as parity, etc., is recorded in a different disk unit to change the storage system to a high reliability storage one.

Figure 12:
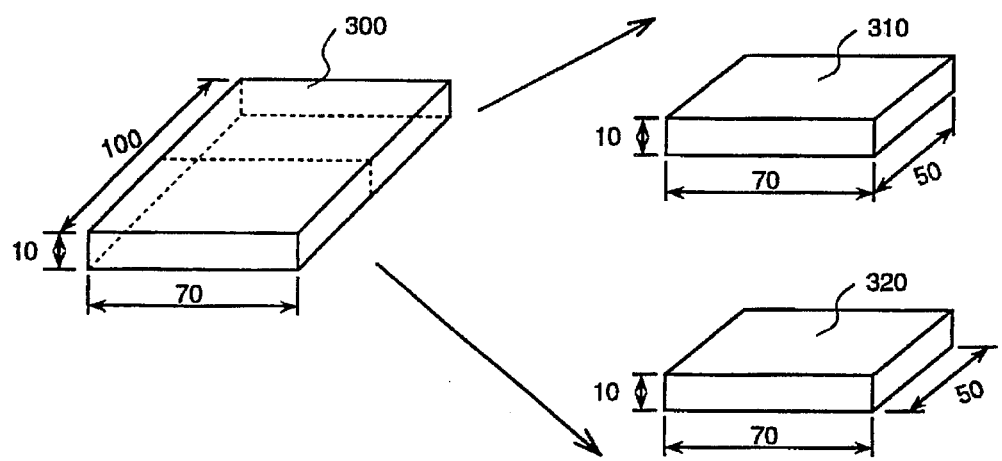
FIG. 12 shows perspective views of a seventh embodiment of the invention illustrating the mounting of a 1.8-inch magnetic disk unit and an IC card memory in the available 2.5-inch form factor.

The 7th embodiment of this invention will be explained below using FIG. 12. The difference from the 6th embodiment is that this embodiment uses a form factor 300 for a 2.5-inch magnetic disk unit. This form factor is actually used to mount a 1.8-inch magnetic disk unit 310 and an IC card memory 320, however. FIG. 12 shows the dimensions of the form factor 300 used for a 2.5-inch magnetic disk unit. This form factor can mount two 1.8-inch magnetic disk units 310.

FIG. 12 shows the external dimensions of the 1.8-inch magnetic disk unit. The dimensions are standardized. The external dimensions of the IC card memory 320 are almost the same as those of the 1.8-inch magnetic disk unit. The connectors of both the IC card memory 320 and 1.8-inch magnetic disk unit are standardized (used commonly). They can be exchanged with no problem. In other words, a 1.8-inch magnetic disk unit and an IC card memory can be combined freely in the 2.5-inch magnetic disk unit form factor. Therefore, the following combinations are possible: (1) two 1.8-inch magnetic disk units, (2) two IC card memories, and (3) a 1.8-inch magnetic disk unit and an IC card memory.

In this embodiment, the combination (3) is adopted. If normal information is received from a personal computer and the normal recording mode is selected by the user, the information is recorded on the 1.8-inch magnetic disk. If information that must be handled at high speeds is received from a computer and the high speed recording mode is selected by the user, the information is recorded in the IC card memory. If the 2.5-inch magnetic disk unit form factor mounts recording units that are a size smaller than others and each of those units has characteristics different from those of others and the user can select/change the combination of those recording devices freely, then this embodiment can provide the user with a storage system most suitable for the type (characteristics) of information to be handled.

Especially, since the connectors of both, the 1.8-inch magnetic disk unit and the IC card memory, are compatible, providing of those connectors to the 2.5-inch magnetic disk unit form factor will allow the user to change freely the combination of the recording devices to be mounted in the form factor according to the application of the user himself. Therefore, if information that requires very high speed and shock resistance properties is to be recorded, all the recording devices in the form factor may be replaced with IC card memories. Therefore, the storage system can be changed easily to a storage system that satisfies very high speed and shock resistance requirements.

In case of the conventional magnetic disk unit, the combination of recording units in the form factor cannot be changed according to the user's operating environment, so it cannot expect the effect as shown in this embodiment.

Figure 13:
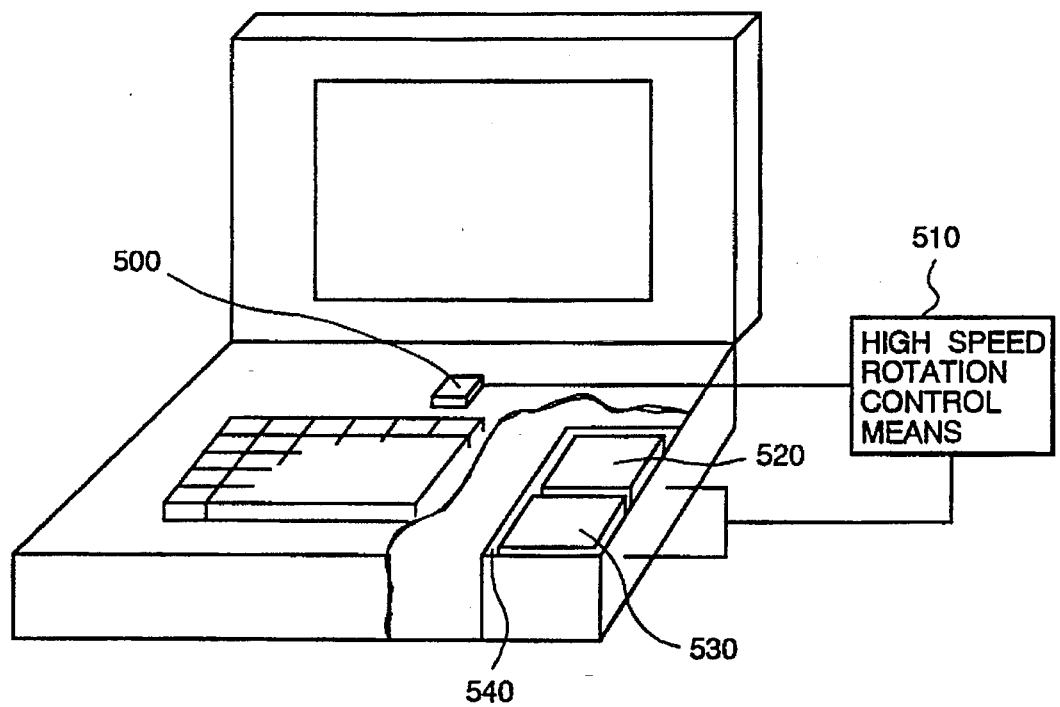
FIG. 13 is a perspective view of a personal computer incorporating the eighth embodiment of the invention.

The 8th embodiment of this invention will be explained using FIG. 13. The difference from the 6th embodiment is that the personal computer in this embodiment uses a magnetic disk unit 520 and an optical disk unit, both of which are a size smaller than form factor 540, respectively, which are mounted in the magnetic disk form factor 540. It also uses high speed rotation control means 510 connected to high speed transfer key 500.

If mass information such as image data is to be transferred to another personal computer, the data transfer speed can be increased by increasing rotation speeds of both the magnetic disk unit 520 and optical disk unit using high speed rotation control means 510 connected to high speed transfer key 500. With this, the most suitable method can be selected to record data, as well as the most suitable transfer speed can be selected to transfer data according to the type of information to be transferred.

According to this invention, a magnetic disk unit or an external recording system that can record information with the most suitable method selected according to the characteristics of the object information can be provided by selecting a recording device provided with characteristics (recording capacity, reliability, and access speed) different from those of others appropriate to the object information or by changing the characteristics (recording capacity, reliability, and access speed) of those devices using a recording/reproducing means in the magnetic disk unit or an external recording system in which the magnetic disk units are combined, which are used widely as an online recording storage system of a computer.

We claim:

1. A storage system comprising:

a magnetic disk;

a magnetic disk unit provided with a magnetic head means for writing and reading information in/from said magnetic disk;

a host device;

an optical disk fixed at the same rotary axis as that of said magnetic disk;

an optical head means for writing and reading information in/from said optical disk; and a recording mode selecting means provided between said magnetic disk unit and said host device;

wherein when said recording mode selecting means selects an optical disk mode, said optical head means is selected and when said recording mode selecting means selects a magnetic disk mode, said magnetic head means is selected.

2. A storage system comprising:

a magnetic disk;

a magnetic disk unit provided with a magnetic head means for writing and reading information in/from said magnetic disk;

a host device; p1 an optical disk fixed at the same rotary axis as that of said magnetic disk;

an optical head means for writing and reading information in/from said optical disk; and a recording mode selecting means provided between said magnetic disk unit and said host device;

wherein when said recording mode selecting means selects a large capacity mode, said optical head means is selected and when said recording mode selecting means selects a high speed mode, said magnetic head means is selected.

3. A storage system connected to a host device comprising:

a magnetic disk unit including:

a magnetic disk medium, a magnetic head for writing and reading information in/from said magnetic disk medium, an optical disk medium fixed at the same rotary axis of said magnetic disk medium, and an optical head means for writing and reading information in/from said optical disk medium; and mode selecting means connected to said magnetic disk unit, said mode selecting means selecting a mode to drive said magnetic disk unit;

wherein when said recording mode selecting means selects an optical disk mode, said optical head is activated and when said mode selecting means selects a magnetic disk mode, said magnetic head is activated.

* * * * *